(12) United States Patent
Coogle

(10) Patent No.: US 7,191,649 B1
(45) Date of Patent: Mar. 20, 2007

(54) WATER LEVEL SENSOR

(76) Inventor: Gregory Coogle, 492 NW. 162 Ave., Pembroke Pines, FL (US) 33028

( * ) Notice: Subject to any disclaimer, the term of this patent is extended or adjusted under 35 U.S.C. 154(b) by 0 days.

(21) Appl. No.: 11/273,210

(22) Filed: Nov. 14, 2005

(51) Int. Cl.
*G01F 23/00* (2006.01)

(52) U.S. Cl. ........................................ 73/313
(58) Field of Classification Search ................. 73/313, 73/307, 319; 62/150; 116/228
See application file for complete search history.

(56) References Cited

U.S. PATENT DOCUMENTS

| | | | |
|---|---|---|---|
| 4,392,128 A | 7/1983 | Young | 340/616 |
| 4,937,559 A | 6/1990 | Meacham | 340/618 |
| 5,028,910 A | 7/1991 | Meacham et al. | 340/616 |
| 5,069,042 A | 12/1991 | Stuchlik | 62/284 |
| 5,522,229 A | 6/1996 | Stuchlik | 62/127 |
| 5,621,393 A | 4/1997 | Urich | 340/616 |
| 5,627,523 A | 5/1997 | Besprozvanny | 340/623 |
| 5,699,049 A | 12/1997 | Difiore | 340/618 |
| 5,898,376 A | 4/1999 | Webb | 340/623 |
| 6,154,144 A | 11/2000 | Johnson | 340/620 |
| 6,442,955 B1 | 9/2002 | Oakner | 62/150 |
| 6,992,259 B1* | 1/2006 | Cantolino | 200/84 R |
| 2005/0166613 A1* | 8/2005 | Oakner et al. | 62/150 |
| 2006/0096639 A1* | 5/2006 | Coogle | 137/268 |

\* cited by examiner

*Primary Examiner*—Hezron Williams
*Assistant Examiner*—Tamiko Bellamy
(74) *Attorney, Agent, or Firm*—Alvin S. Blum

(57) ABSTRACT

A liquid level sensor apparatus for monitoring the drain line of condensate from an air handler of a refrigeration system senses the presence of backup liquid in a vertical pipe in the drain system. A closure of the upper end of the pipe supports a magnetic switch assembly down in the pipe. A float with magnet surrounds the switch. When water in the pipe raises the float to a fixed distance below the closure, the magnet opens the switch circuit to control the air conditioning system. A vent in the closure permits air in the pipe to escape as the water rises in the pipe. Optical and sonic alarms may be included.

15 Claims, 5 Drawing Sheets

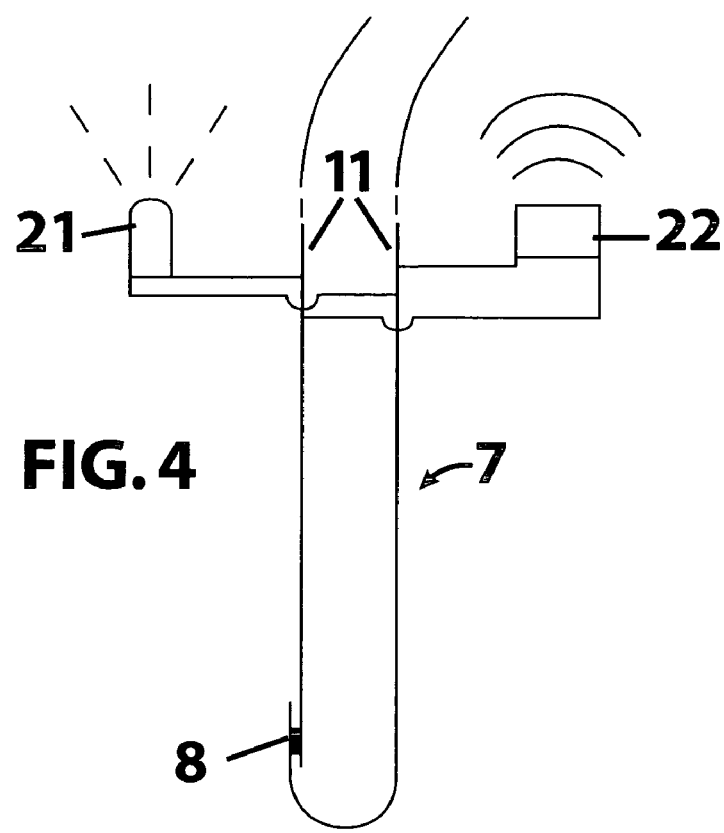
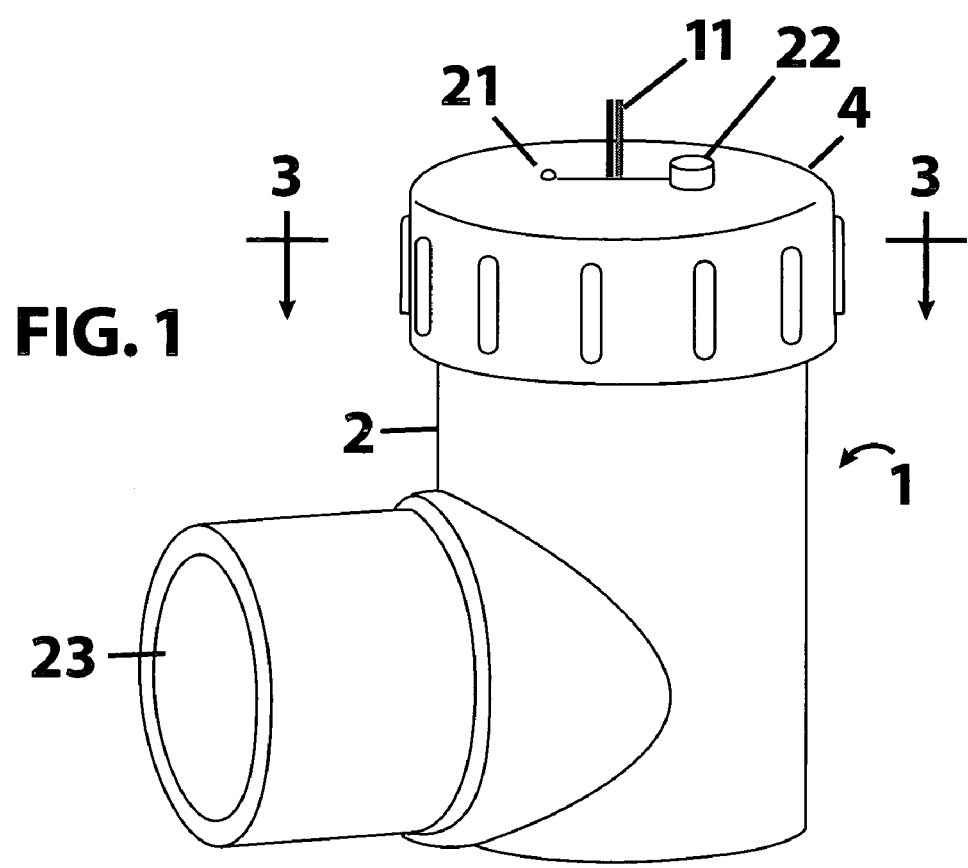

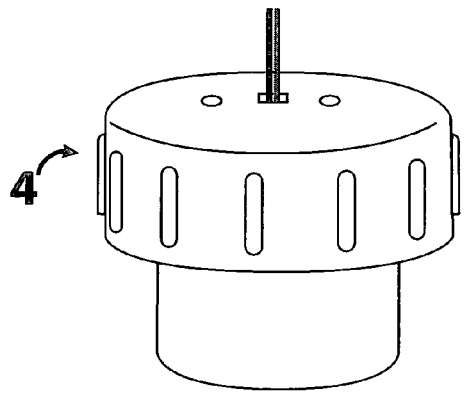
FIG. 2
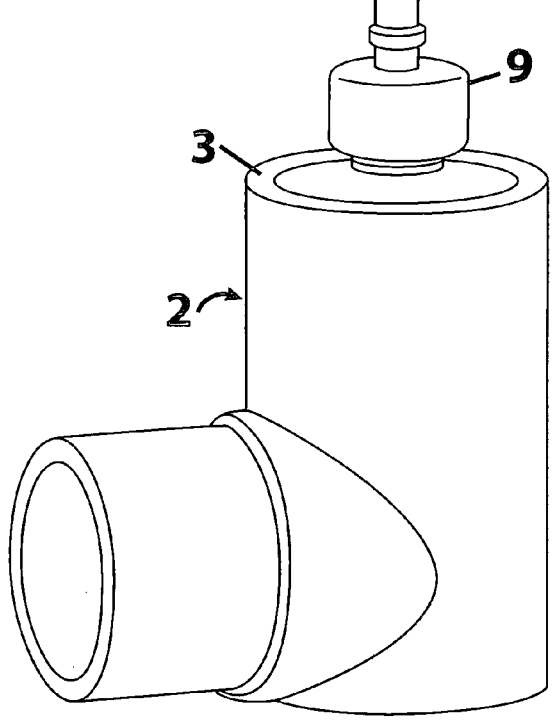
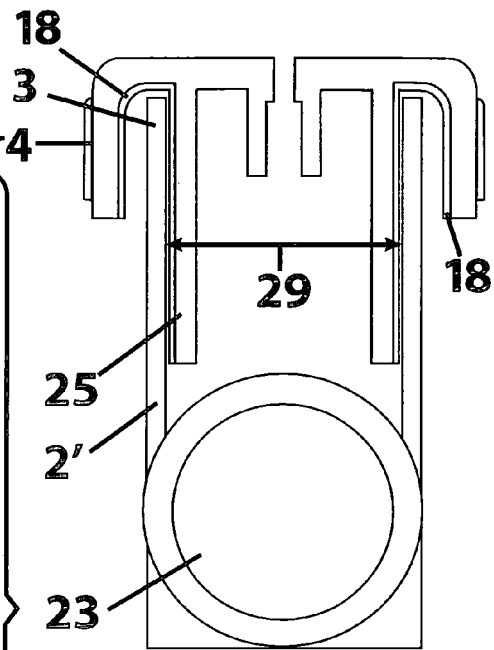
FIG. 5
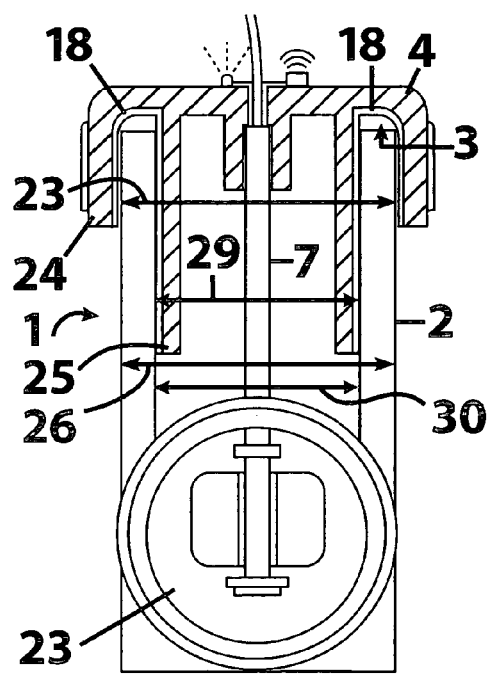
FIG. 3

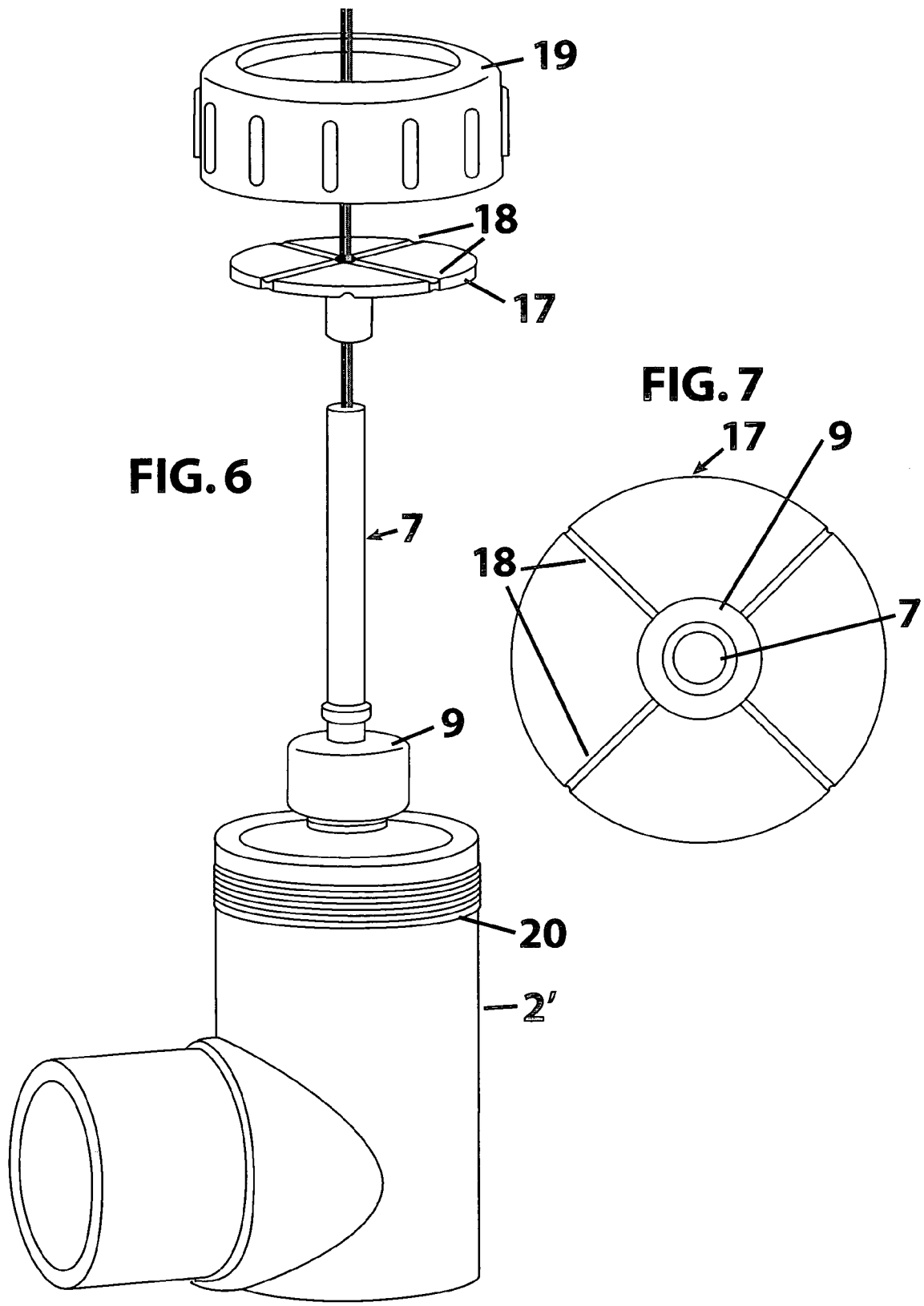

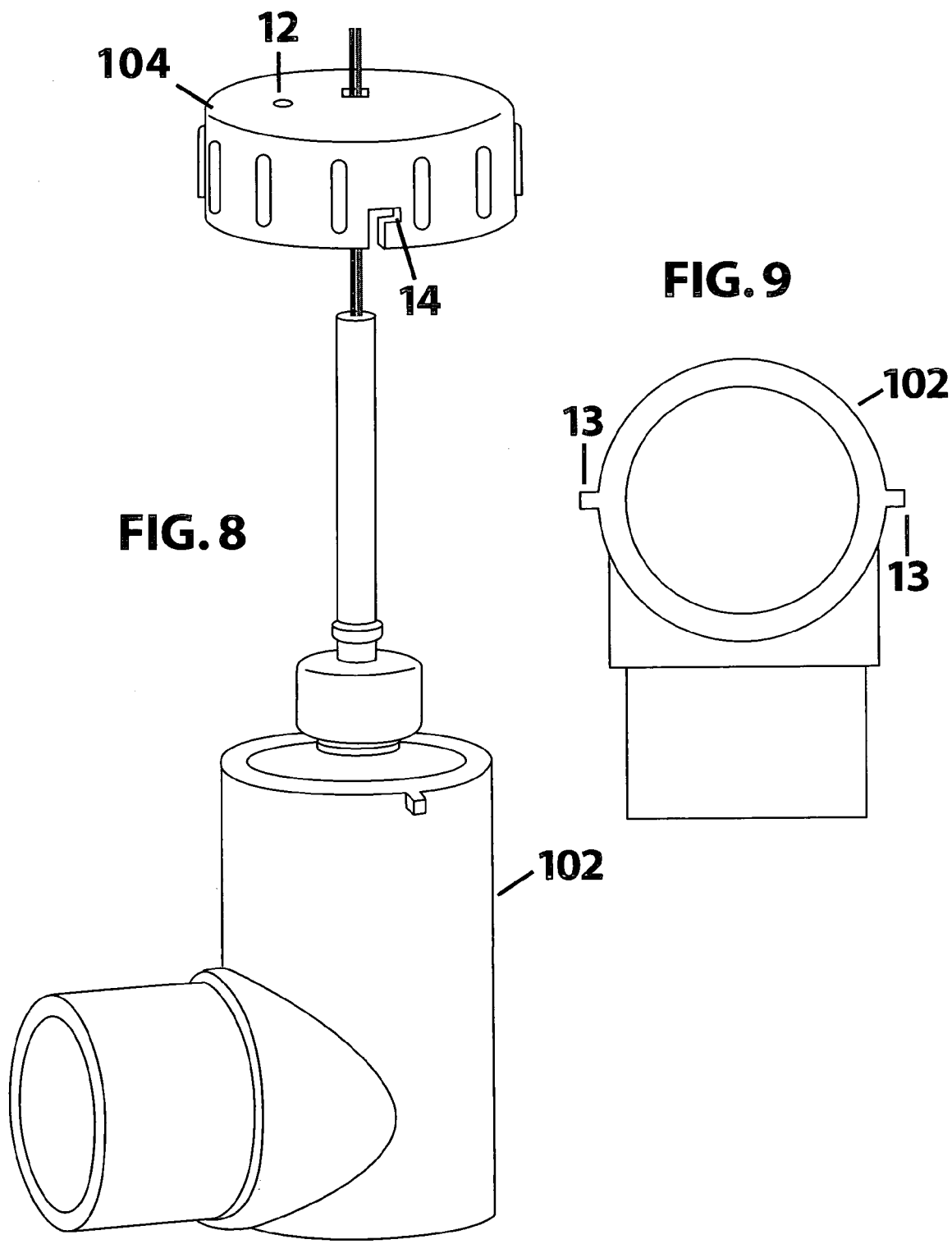

WATER LEVEL SENSOR

BACKGROUND OF THE INVENTION

This invention relates to liquid level sensors, and more particularly to apparatus sensing a blockage in the drain from an air conditioner evaporator drain pan to shut down an air conditioner and/or to actuate an alarm.

SUMMARY OF THE INVENTION

A liquid level sensor apparatus for monitoring the drain line of condensate from an air handler of a refrigeration system senses the presence of backup liquid in a vertical pipe in the drain system. A closure of the upper end of the pipe supports a magnetic switch assembly down in the pipe. A float with magnet surrounds the switch. When water in the pipe raises the float to a fixed distance below the closure, the magnet opens the switch circuit to control the air conditioning system. A vent in the closure permits air in the pipe to escape as the water rises in the pipe. Optical and sonic alarms may be included. The vent may be covered to prevent inadvertent obstruction of the vent. The height of water in the pipe that will trigger the sensor may be adjusted by adjusting the length of the vertical pipe.

These and other objects, features, and advantages of the invention will become more apparent when the detailed description is studied in conjunction with the drawings, in which like elements are designated by like reference characters in the various drawing figures.

BRIEF DESCRIPTION OF THE DRAWINGS

FIG. 1 is a perspective view of the apparatus of the invention.

FIG. 2 is an exploded view of the invention of FIG. 1.

FIG. 3 is a sectional view through line 3—3 of FIG. 1.

FIG. 4 is a schematic of the circuit with alarms.

FIG. 5 is a sectional view as in FIG. 3 with the device applied to a thinner wall pipe.

FIG. 6 is an exploded view of another embodiment of the invention.

FIG. 7 is a plan view of the underside of the disc of FIG. 6.

FIG. 8 is an exploded view of another embodiment of the invention.

FIG. 9 is a top view of the pipe of FIG. 8.

DETAILED DESCRIPTION OF PREFERRED EMBODIMENTS

Figures 10, 11:
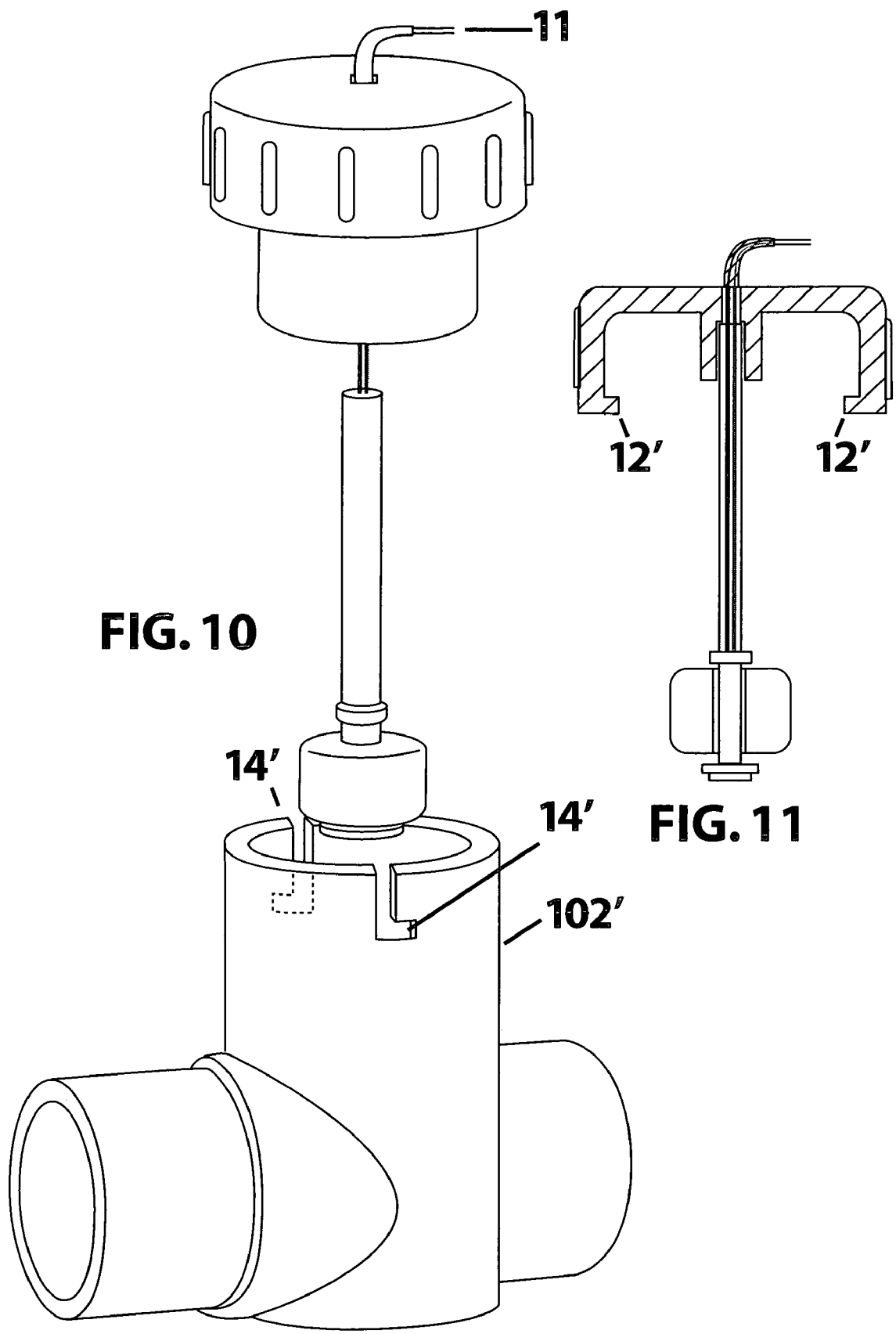
FIG. 10 is an exploded view of another embodiment of the invention.
FIG. 11 is a sectional view through the cap of FIG. 10.

Referring now first to FIGS. 1–5, a liquid level sensing apparatus 1 of the invention comprises a vertical tube or pipe 2 that is connected to the drain line 23 from the condensate pan of the air handling unit of an air conditioner (not shown). The pipe 2 has an open upper end 3. A closure in the form of a cap 4 covers the end 3 of the pipe. The cap has an inner face 5 that rests upon the open end 3, and an outer face 6. An outer cylindrical sleeve 24 extends downward. It has an inside diameter 27 dimensioned so as to receive therein the outside diameter 26 of the pipe. An inner cylinder 25 extends downward from the bottom face inside the outer sleeve. It has an outside diameter 29 to engage the inside diameter 30 of a standard pipe. Certain pipes commonly used in the industry will be offered in two schedules or forms for a standard inside diameter. They will both have the same inside diameter, but one will have a thicker wall. The cap of the invention is constructed to be used with the two wall thicknesses. As shown in FIG. 5, the same cap is applied to a pipe 2' with the thinner wall. An elongate switch assembly 7 extends downward from the bottom face inside the inner cylinder. The switch assembly has wires 11 extending through the cap 4 and down to enclosed magnetically actuated contacts 8 that are normally closed. A captive annular float assembly 9 surrounds the switch assembly. It carries a magnetic field to open the contacts when water lifts the float to a preset distance below the bottom face. Because the switch assembly and float are positioned at a fixed distance below the cap, the level of water in the pipe that will actuate the switch is adjusted by simply cutting off some of the vertical pipe. At least one groove 18 on the inner aspect of the cap provides air passage from the pipe to the surroundings. This ensures that the cap will not seal off the air space in the pipe 2 and prevent water from rising in the pipe. The grooves 18 are so located that they are covered to prevent debris that might fall on the apparatus from inadvertently blocking the air passages.

FIG. 4 shows schematically that a sonic alarm 22 and a light emitter 21 may be wired in parallel with the wires. They will not be powered while the contact 8 is closed. When the magnetic float is raised, and the contact opens, then power will be applied to the optical alarm 21 and audible alarm 22. When the contacts are closed, there is no power to the alarms.

Referring now to the FIGS. 6 and 7, another embodiment of the invention comprises a closure in form of a disc 17 having an elongate magnetic switch assembly 7 with magnetic float 9 dependent from the bottom face of the disc. Radial grooves or air channels 18 on the top and bottom faces of the disc serve as covered vents to enable air in the pipe 2' to escape. An annular cylindrical element 19 has inside threads (not shown) which cooperate with external threads 20 on the pipe to secure the disc in place atop the pipe.

FIGS. 8 and 9 show an embodiment of the invention in which the closure 104 has a through hole 12 that serves as a vent for passage of air from the pipe 102. The pipe 102 is provided with a pair of opposed radial pins 12 that engage slots 14 in the closure to secure the closure by a bayonet type connection.

FIGS. 10 and 11 show an embodiment of the invention in which the closure 104' is provided with a pair of opposed radial pins 12' that engage slots 14' in the pipe 102' to secure the closure by a bayonet type connection.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A liquid level sensing apparatus comprising:
   a) a vertical tube for carrying condensate in a drain line, the tube having an open upper end;
   b) a closure removably covering the open upper end, the closure having an inner face engaging the open end, and an outer face outside the tube;
   c) means for securing the closure to the tube;

d) an elongate switch assembly affixed to the inner face of the closure and depending therefrom with a magnetically operable switch disposed a fixed distance below the inner face;
e) a captive float encircling the switch assembly and carrying a magnet to actuate the switch when liquid raises the float to a preset distance below the inner face;
f) wires connected to the switch and passing through the closure; and
g) venting means at the closure for enabling the passage of air from the tube.

2. The apparatus of claim 1 in which the means for securing the closure to the tube include a pair of opposed pins extending from one of the closure or the tube and cooperating slots in the other, such that a turn of the closure of less than one half of a revolution will provide a secure attachment.

3. The apparatus of claim 1 in which the closure and the upper end of the tube are provided with cooperating threads as a means for securing the closure to the tube.

4. The apparatus of claim 1 in which an annular cylindrical element engages the outer face of the closure, the element having female threads that cooperate with male threads on the tube to secure the closure to the tabulation.

5. The apparatus of claim 4 in which the outer face and inner face of the closure are provided with radial air channels to function as said venting means.

6. A liquid level sensing apparatus for an air conditioning control comprising:
a) a vertical pipe having an open upper end, the pipe in fluid connection to the drain pan of an air conditioning unit for carrying condensate to a drain;
b) a closure removably covering the open upper end, the closure having an inner face engaging the open end, and an outer face outside the pipe;
c) means for securing the closure to the pipe;
d) an elongate switch assembly connected to the control, the switch assembly affixed to the inner face of the closure and depending therefrom with a magnetically operable switch having normally closed contacts disposed a fixed distance below the inner face;
e) a captive float encircling the switch assembly and carrying a magnet to actuate the switch when liquid raises the float to a preset distance below the inner face;
f) two wires that are connected to the switch contacts connected to at least one of an audible and a visible alarm mounted on the closure for signaling when the contacts are open, the wires then passing from the closure for connection to the control; and
g) covered venting means at the closure for enabling the passage of air from the pipe while preventing inadvertent occlusion of the passage by debris.

7. The apparatus of claim 6 in which the means for securing the closure to the pipe include a pair of opposed pins extending from one of the closure or the pipe and cooperating slots in the other, such that a turn of the closure of less than one half of a revolution will provide a secure attachment.

8. The apparatus of claim 6 in which the closure and the upper end of the pipe are provided with cooperating treads as a means for securing the closure to the pipe.

9. The apparatus of claim 6 in which an annular cylindrical element engages the outer face of the closure, the element having female threads that cooperate with male threads on the pipe to secure the closure to the pipe.

10. The apparatus of claim 9 in which the outer face and the inner face of the closure are provided with radial air channels to function as said venting means.

11. Liquid sensor apparatus for monitoring the drain line of condensate from an air handler of a refrigeration system to sense the presence of backup liquid therein, the apparatus comprising:
a) a cap having a top face and a bottom face;
b) an outer cylindrical sleeve extending downward from the top face, the sleeve having an inside diameter dimensioned to receive therein the open vertical end of a standard plumbing pipe of a particular inside diameter connected to the drain line for carrying condensate to a drain;
c) an inner cylinder extending downward from the bottom face, the cylinder having an outside diameter dimensioned to snugly receiver thereon the inside diameter of a standard plumbing pipe of a particular inside diameter;
d) an elongate switch assembly extending downward from the bottom face inside the inner cylinder, the assembly having a magnetically operable switch with normally closed contacts disposed a fixed distance below the bottom face, and wires extending from the contacts through the upper face of the cap;
e) venting means formed in the cap for enabling the passage of air from the pipe; and
f) a captive float encircling the assembly and carrying a magnet to actuate the switch and open the contacts when liquid raises the float to a preset distance below the bottom face.

12. The apparatus of claim 11 constructed to slide onto the vertical open end of a standard pipe for use, and to slide off for introducing chemicals into the drain line.

13. The apparatus of claim 12 further comprising at least one of a light emitting diode and a sonic signal mounted on the outer face of the cap and connected across the wires.

14. The apparatus of claim 11 further comprising at least one of a light emitting diode and a sonic signal mounted on the outer face of the cap and connected across the wires.

15. The apparatus of claim 11 further comprising covered venting means formed in the cap for enabling the passage of air from the pipe while preventing inadvertent occlusion of the passage by debris.

* * * * *